United States Patent
Krier et al.

(10) Patent No.: US 10,675,975 B2
(45) Date of Patent: Jun. 9, 2020

(54) GLASS LENS ASSEMBLY WITH AN ELASTIC ADHESIVE

(71) Applicant: VISTEON GLOBAL TECHNOLOGIES, INC., Van Buren Township, MI (US)

(72) Inventors: James Frederick Krier, Grosse Pointe Woods, MI (US); Robert Edward Belke, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 497 days.

(21) Appl. No.: 14/689,515

(22) Filed: Apr. 17, 2015

(65) Prior Publication Data

US 2016/0303970 A1   Oct. 20, 2016

(51) Int. Cl.
| | | |
|---|---|---|
| *B60K 35/00* | (2006.01) | |
| *G02B 7/02* | (2006.01) | |
| *B60K 37/02* | (2006.01) | |
| *B29C 65/48* | (2006.01) | |
| *B29L 11/00* | (2006.01) | |
| *B29C 65/00* | (2006.01) | |
| *B29L 12/00* | (2006.01) | |

(52) U.S. Cl.
CPC .............. *B60K 35/00* (2013.01); *B60K 37/02* (2013.01); *G02B 7/02* (2013.01); *B29C 65/48* (2013.01); *B29C 66/1162* (2013.01); *B29C 66/5346* (2013.01); *B29C 66/73112* (2013.01); *B29C 66/7465* (2013.01); *B29L 2011/0016* (2013.01); *B29L 2012/00* (2013.01); *B60K 2370/20* (2019.05); *B60K 2370/693* (2019.05)

(58) Field of Classification Search
CPC ...... B60K 2350/206; B60K 2350/2086; B60K 35/00; B60K 37/02; B29L 2011/0016; G02B 7/02; B60R 1/082
USPC .......................................................... 428/38
See application file for complete search history.

(56) References Cited

U.S. PATENT DOCUMENTS

| | | | | |
|---|---|---|---|---|
| 2,166,303 A | * | 7/1939 | La Hodny | B60R 1/12 359/839 |
| 3,829,201 A | * | 8/1974 | Whiting | G02C 1/10 351/154 |

(Continued)

FOREIGN PATENT DOCUMENTS

| | | |
|---|---|---|
| EP | 2 372 503 A1 | 10/2011 |
| JP | 2014-186212 A | 10/2014 |

*Primary Examiner* — Alicia J Sawdon
(74) *Attorney, Agent, or Firm* — Quinn IP Law

(57) ABSTRACT

A lens assembly, and a method for providing a lens assembly is disclosed herein. The lens assembly includes a first frame piece with a first edge on the direction in which a viewer of the electronic display would face, the first edge forming a first angle with a second edge; a second frame piece with a third edge on the direction in which a viewer of the electronic display would face, the third edge forming a second angle with a fourth edge; a lens with a first lens edge facing the viewer, a second lens edge and third lens edge connected to the first lens edge and forming a lens angle; a first adhesive layer placed between the second edge and the second lens edge to attach the first frame piece to the lens; and a second adhesive layer placed between the fourth edge and the third lens edge to attach the second frame piece to the lens.

10 Claims, 8 Drawing Sheets

(56) References Cited

U.S. PATENT DOCUMENTS

| | | | | |
|---|---|---|---|---|
| 4,679,918 A | * | 7/1987 | Ace | G02C 7/02 |
| | | | | 351/159.62 |
| 8,792,252 B2 | | 7/2014 | Hwang et al. | |
| 2005/0117234 A1 | * | 6/2005 | Lo | B60R 1/082 |
| | | | | 359/866 |
| 2006/0255960 A1 | * | 11/2006 | Uken | B60K 35/00 |
| | | | | 340/815.4 |
| 2009/0208882 A1 | * | 8/2009 | Schmid | B29C 43/003 |
| | | | | 430/324 |
| 2011/0065051 A1 | * | 3/2011 | Sudoh | G02B 7/025 |
| | | | | 430/325 |
| 2012/0242588 A1 | * | 9/2012 | Myers | G06F 1/1637 |
| | | | | 345/173 |

* cited by examiner

GLASS LENS ASSEMBLY WITH AN ELASTIC ADHESIVE

BACKGROUND

Electronic displays facilitate the reproduction of data via a lighted platform. Driving circuitry is employed to manipulate lighted elements to render the information being displayed. The viewer may gaze upon the display and view the lighted elements to process and consume the information.

The electronic display may be implemented in various contexts and locations. For example, the electronic display may be situated in a vehicle, and specifically, a center stack location. The center stack may include various non-digital elements associated with the vehicle, such as an analog control, paneling, bezel, and the like. These elements may be employed to present and control information about the vehicles entertainment, navigation and climate control functions for example.

Manufacturers may desire to present the electronic display in a manner that is integrated with the center stack. The center stack is the location on a vehicle instrument panel situated between the front seat driver and passenger locations. This location is subject to various government regulatory crash safety specifications, namely United Nations Economic Commission for Europe Regulation 21 (ECE21) & United States Federal Motor Vehicle Safety Standard 201 (FMVSS201). These safety regulations require that no dangerous conditions exist after a simulated crash with a metal sphere representing a person's head. These dangerous conditions include debris and sharp edges resulting from breakage that could injure the vehicle occupant during the crash or during egress from the vehicle, for example. In these situations, the electronic display may be situated with an anti-shatter plastic film laminated lens. This may further be situated with a plastic (or other material) capable of mounting the lens. There is a trend to have an exposed strengthened glass lens instead of plastic for improved scratch and craftsmanship. The figures shown are all glass lens embodiments with plastic frames.

FIG. 1 illustrates an example of a picture frame implementation of an electronic display 100. As shown, a lens 110 is held in place by a frame 120, the lens 110 includes a visible portion 111 that serves to convey the information associated with electronic display 100's presentation. Also shown is an offset distance 130. This corresponds to the amount of area associated with the distance dedicated to the lens 110 and the frame 120. Further, a distance 140 is shown based on the portion of the electronic display 100 dedicated to the frame 120. This leads to a distance 150 associated with lens 110 that is obscured by the frame 120, as well as a required clearance gap 160 based on the placement of the lens 110 to frame 120; gap 160 distance is a function of mechanical tolerances to avoid interference as well as allowances for material thermal coefficient of expansion differential mismatch of lens 110 and frame 120. In the case of glass lens 110 and plastic frame 120, typical coefficients of expansion for glass are substantially smaller than plastic, as the device is exposed to lower temperatures than ambient, frame 120 shrinks relative to lens 110. If the gap 160 becomes zero, stress occurs at the joint that can lead to structural failure.

Thus, the electronic display 100 allows protection during an impact (i.e. a crash); however, significant portions of the lens 110 are not visible due to the configuration shown and offset 130 is necessary.

FIG. 2 illustrates an example of a implementation of an electronic display 200; this is commonly used for smartphone construction. As shown in FIG. 2, a lens 110 is provided and supported via a frame 220. In contrast to FIG. 1, the frame 220 provides a backing portion/support on the lens 110.

The backing portion creates a distance 230 due to mechanical tolerance stackups to bring the various elements together. Further, gap 260 is necessary for the same reasons as gap 160. Also shown in this implementation is a distance 249 and distance 250.

This implementation may be aesthetically more desirable than the implantations shown in FIG. 1. However, due to the opposition caused by the frame 220 and the lens 110 being in the point of impact, the durability of this implementation is much lesser during impact situations because although impact at the center of the lens may allow some flexure of lens 110; impact away from center of lens 110 presents a higher state of stress between gap 260 and center of lens 110 since frame distance 250 prevents compliance flexure of lens 110.

FIG. 3 illustrates an example of an exposed implementation of an electronic display 300. As shown in FIG. 3, a lens 310 is provided along with a frame 320. The frame 320 is placed behind the lens 310, and connected with a fastening substance. The interaction between the frame 320 and the lens 310 defines the following dimensions 330, 340, and 350.

In order for the implementation to work, the dimensions of 330, 340, and 350 have to be of a specific amount. Further, due to the interplay between the frame 320 and the lens 310, the implementation may be brittle and subject to breaking in response to impact for the same reasons listed on FIG. 2. In addition, in the case of glass, the edges generally have more structural flaws from fabrication than the faces of the glass, so direct impact on these flaws is undesirable.

Thus, as explained above with regards to FIGS. 1-3, the existing implementations of providing a lens with an electronic display system each have issues that make the various implementations lacking in simultaneous solution of providing both an aesthetic finish, with the durability required for impact and inability to accommodate thermal coefficient of expansion differential mismatch.

SUMMARY

Additional features of the invention will be set forth in the description which follows, and in part will be apparent from the description, or may be learned by practice of the invention.

A lens assembly, and a method for providing a lens assembly is disclosed herein. The lens assembly includes a first frame piece with a first edge on the direction in which a viewer of the electronic display would face, the first edge forming a first angle with a second edge; a second frame piece with a third edge on the direction in which a viewer of the electronic display would face, the third edge forming a second angle with a fourth edge; a lens with a first lens edge facing the viewer, a second lens edge and third lens edge connected to the first lens edge and forming a lens angle; a first adhesive layer placed between the second edge and the second lens edge to attach the first frame piece to the lens; and a second adhesive layer placed between the fourth edge and the third lens edge to attach the second frame piece to the lens.

The first frame piece and the second frame piece may be part of the same frame. Thus, the two frames are formed with a singular piece, with an aperture contained within.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
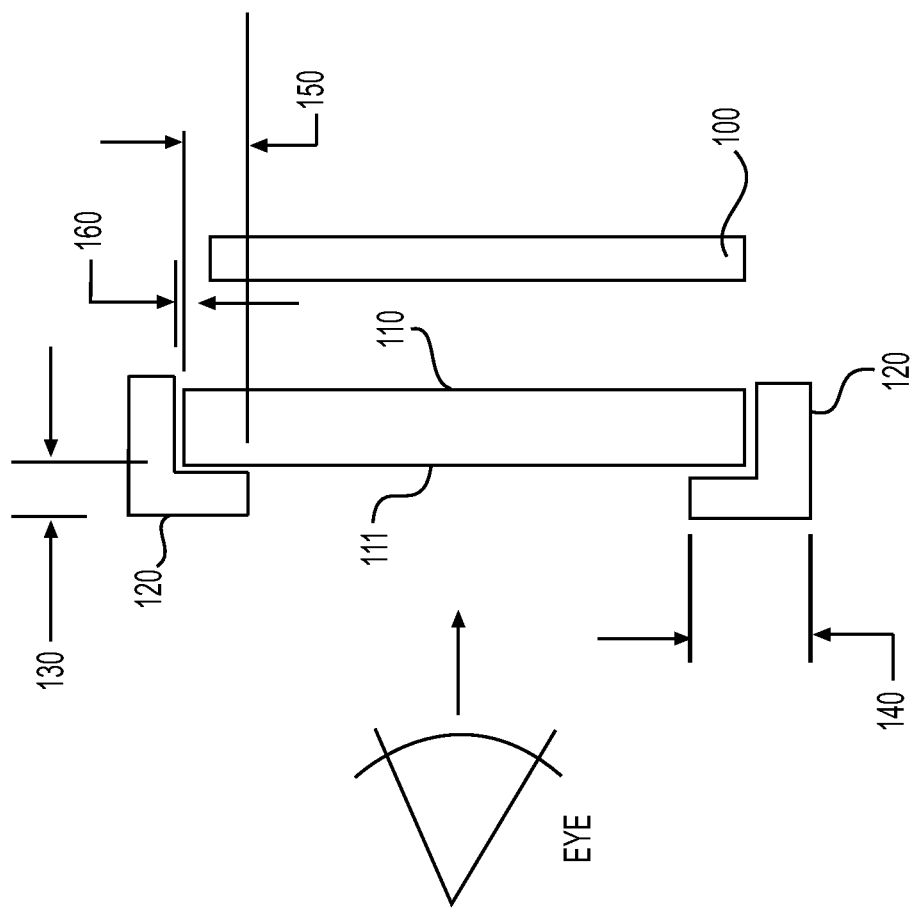
FIG. 1 illustrates an example of a picture frame implementation of an electronic display.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Figure 2:
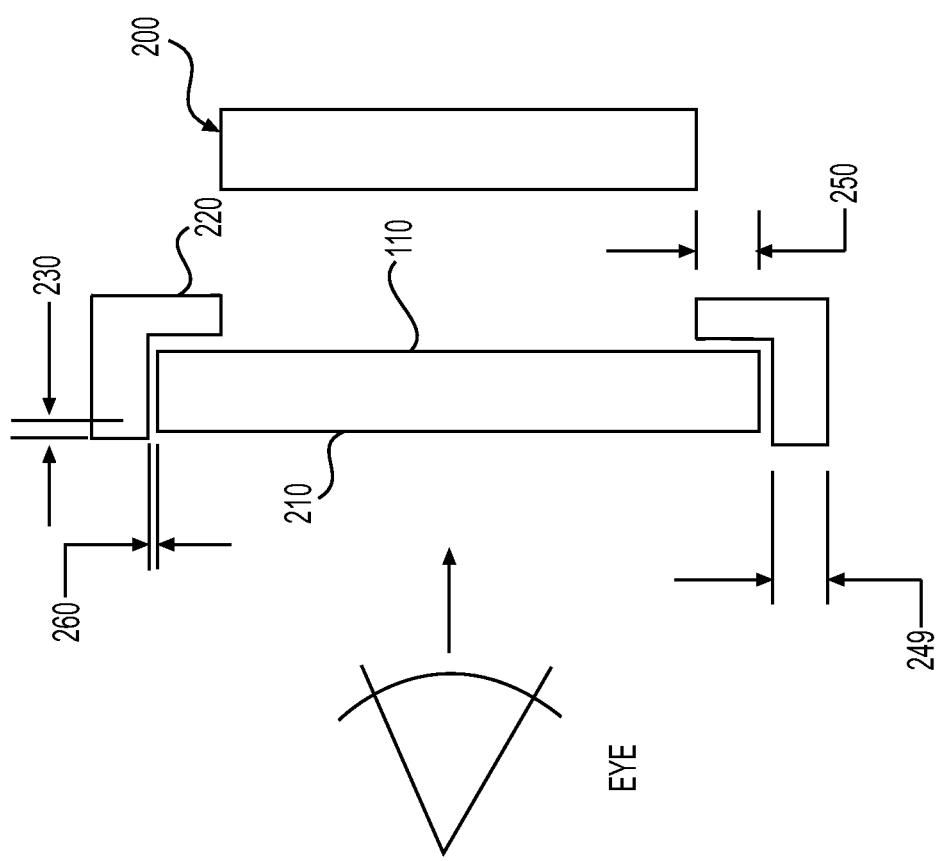
FIG. 2 illustrates an example of a smart phone implementation of an electronic display.
Figure 3:
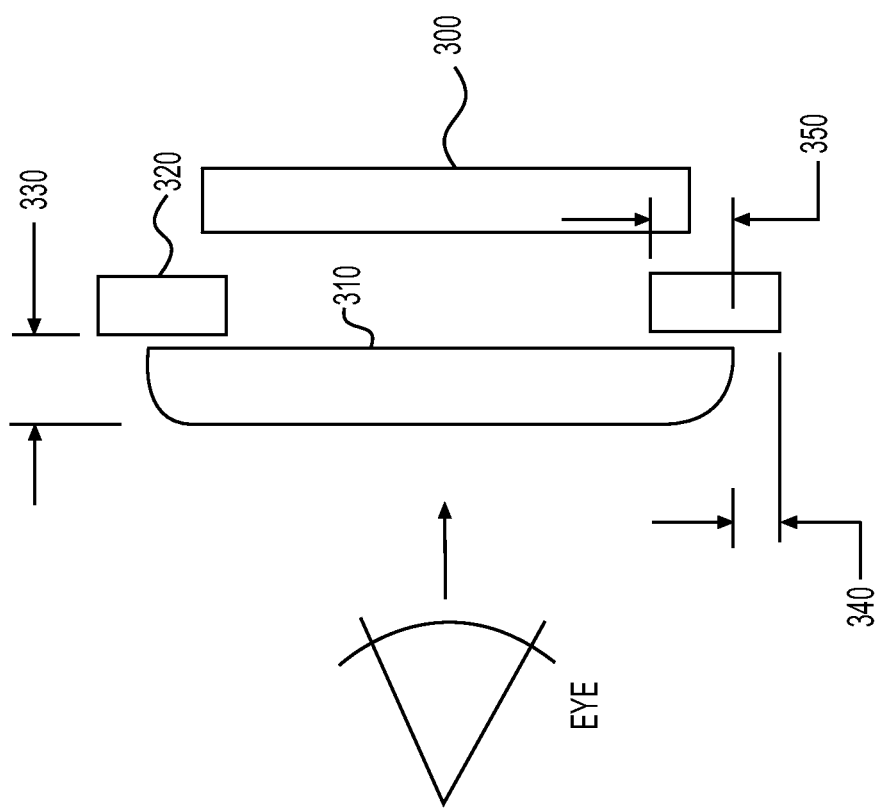
FIG. 3 illustrates an example of an exposed implementation of an electronic display.

Electronic displays are situated with lens and attachments for the lenses. The attachments come in different types, such as those shown in FIGS. 1-3. As explained above, the electronic displays may be installed and provided with specific environments, such as a center stack in an automobile. The structures shown below in the following figures are described in the context of a vehicle. However, the various electronic displays may be implemented in other situations.

Disclosed herein are a lens assembly and a method for providing a lens assembly. The concepts disclosed herein provide both an aesthetically pleasing installation while ensuring the structural integrity of the assembly. Also, as explained below, the assembly employing the aspects disclosed herein adjusts for various changes due to temperature changes.

FIGS. 4(a)-(e) illustrate a method for providing a lens assembly according to the aspects disclosed herein. Referring to FIGS. 4(a)-(e), the lens assembly shown may be implemented in the various contexts disclosed herein.

Figure 4A:
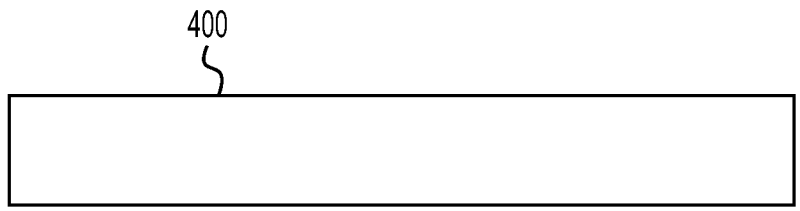
FIGS. 4(a)-(e) illustrate a method for providing a lens assembly according to the aspects disclosed herein.

In FIG. 4(a), a framing layer 400 is provided. The framing layer 400 may be any sort of solid substance employed to provide a support for a lens 430 shown below. The framing layer 400 may be built into a center stack area of a vehicle.

Figure 4B:

In FIG. 4(b), the framing layer 400 is modified to provide a tapered edge as shown. Thus, the framing layer 400 produces two profiled surfaces 411. Each surface 411 is provided with an angle less than 90 degrees. The pieces 410 and 420 may form the bezel of lens assembly. It will be noted that pieces 410 and 420 are not separate pieces, but rather a cross sectional view of a panel with a beveled surfaces. The pieces 410 and 420 are shown as separate elements for explanatory purposes.

Figure 4C:
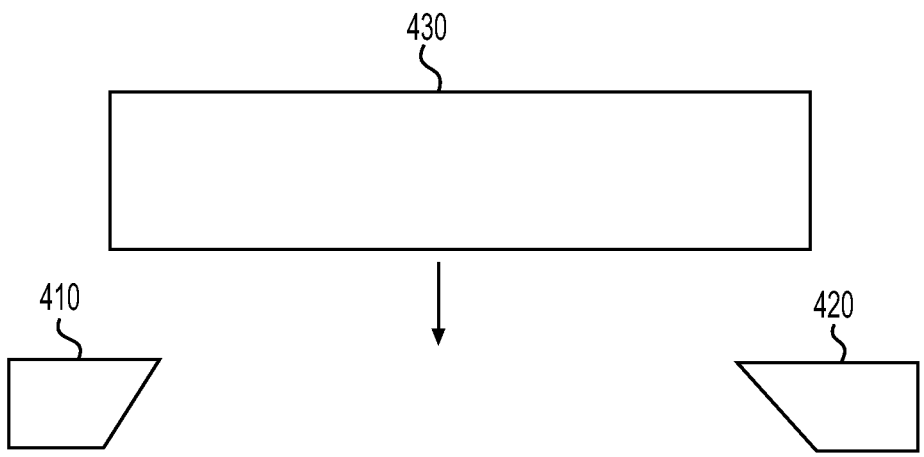

In FIG. 4(c), a lens 430 is provided. The lens 430 may be any sort of covering employed in an electronic display. The lens 430 is transparent, or semi-transparent and allows the passage of light to go through and convey information.

Figure 4D:
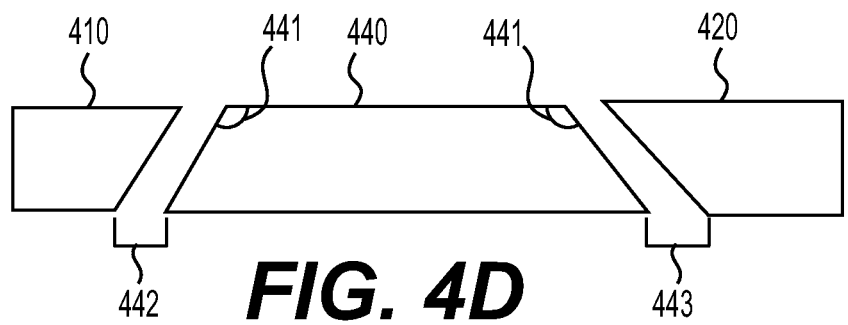

In FIG. 4(d), the lens 430 is manipulated or machined to look like the lens 440 shown. Thus, the lens 440 is provided within a space or gap in between pieces 410 and 420. The angle 441 is greater than 90 degrees, an allows for placement in between the pieces 410 and 420. As shown, there is a gap provided 442 and 443 in between the various elements.

Figure 4E:
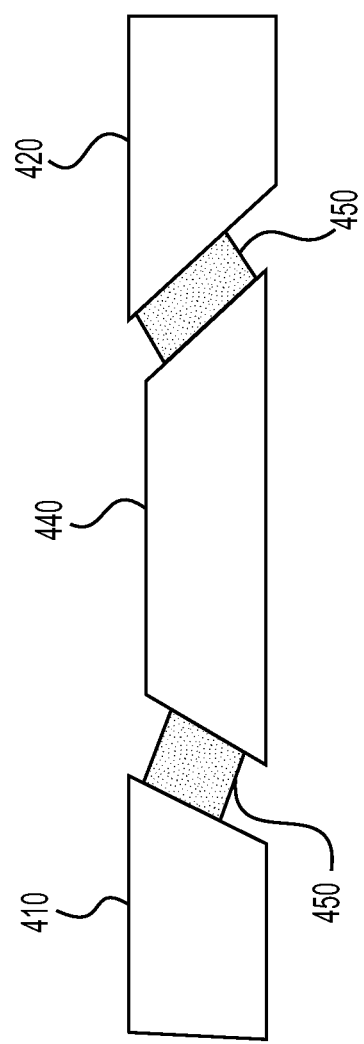

In FIG. 4(e), an elastic adhesive 450 is placed in the gaps 442 and 443. The adhesive 450 may allow attachment between the pieces 410 and 420 and the lens 440. Further, the adhesive is moveable and allows the lens 440 to move back and forth while still maintaining attachment of the pieces 410 and 420.

The elastomeric adhesive 450 may be chosen with a Young's elastic modulus ranging from between 0.1 through 10 Mpa but with practical example range of 0.2 to 2 Mpa although the adhesive may not act elastically under all conditions. Accordingly, the adhesive 450 is capable of being moved/deformed; however, this movement is predefined under a specific amount within the elongation to breakage limits of the chosen adhesive.

Figure 5:
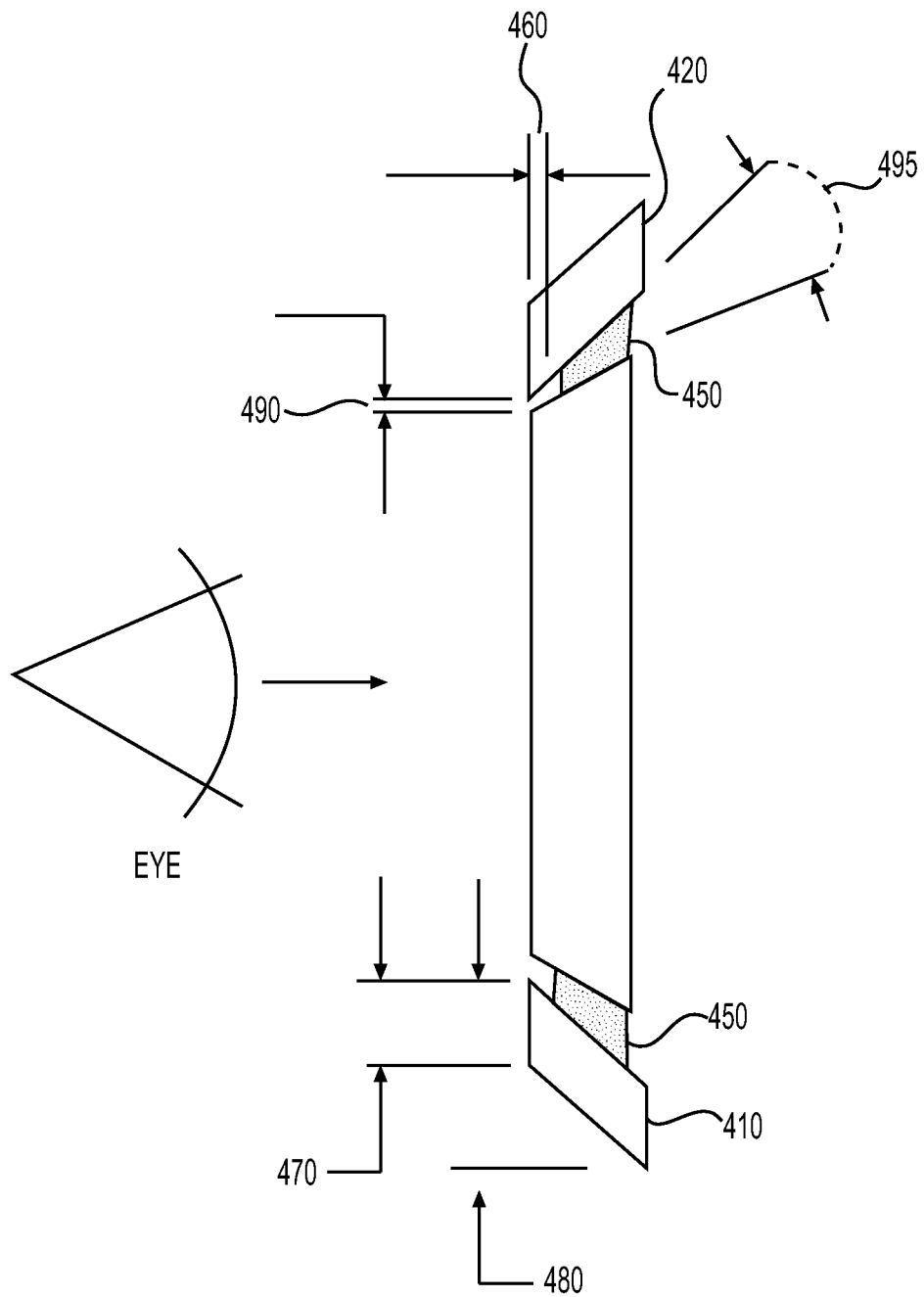
FIG. 5 illustrates an example of the lens assembly shown in FIGS. 4(a)-(e) with various parameters employed for sizing and spacing.

FIG. 5 illustrates an example of the lens assembly shown in FIGS. 4(a)-(e) with various parameters employed for sizing. As shown, dimensions 460, 470, 480, and 490 are illustrated. These dimensions represent various portions of the assembly that may be sized to provide different properties (based on predefined determinations). The implementer of the lens assembly may size the various dimensions based on a desired dimension, or likelihood to satisfy various stress and strain conditions.

For example, dimension 460 ("flush lens distance") may be improved upon from the examples shown in the Background; fixturing of lens to frame during adhesive bonding is one method for achieving flush design without mechanical stackup constraints. Further, the bevel angle 495 can be set or predefined based on defined angle sizes for various thickness employed, and the dimensions described above.

Figure 6A:
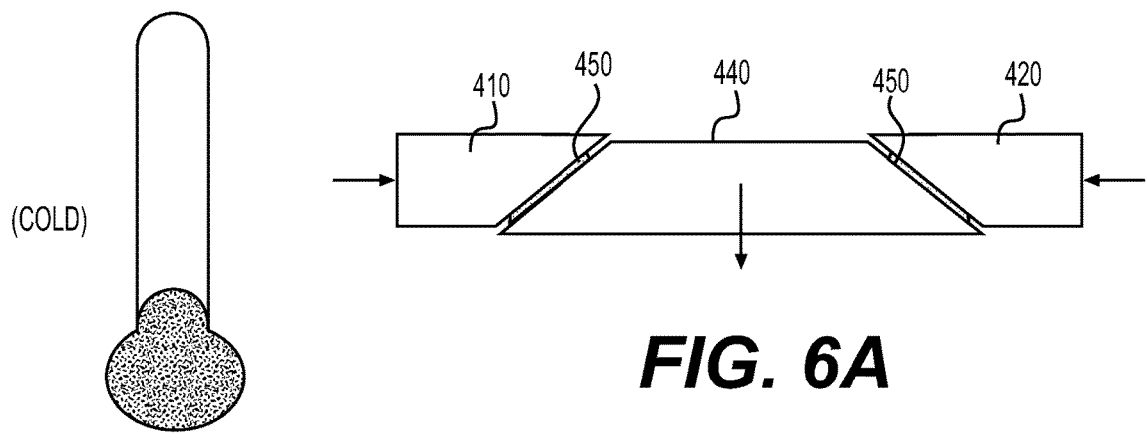
FIGS. 6(a), (b) and (c) illustrate an example of the lens assembly undergoing various environmental conditions that cause thermal coefficient expansion.
Figure 6B:
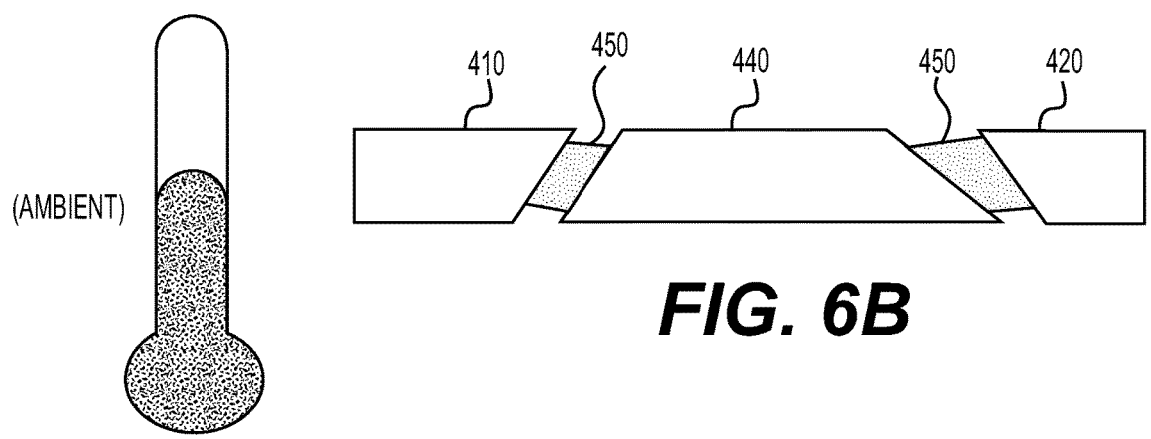
Figure 6C:
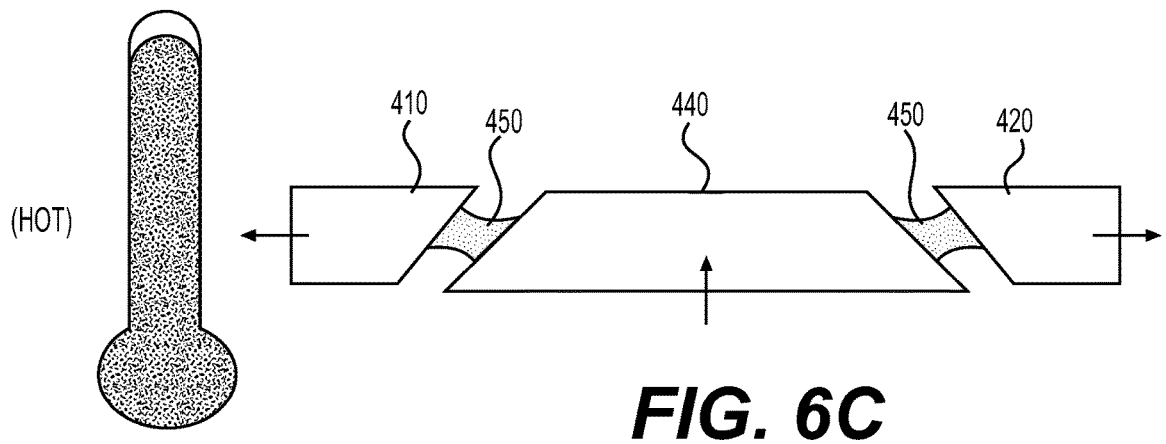

As explained in FIGS. 6(a)-(c), the adhesive layer 450 expands and contracts based on the differential thermal coefficient of expansion (TCE) of frame and lens components, temperature range desired and size of the lens. The dimension 490 may be set accordingly to compensate for various TCE. Further, the bevel angle 495 may also be set to address TCE.

Further, the dimension 490 can be aesthetically improved compared to an air gap by dispensing an appropriate color of adhesive that can fill the air gap. Further, the adhesive 450 may be jigged during assembly, and thus provide a refined adhesive joint appearance of the front surface towards the viewer. This may occur by forming the adhesive into a uniform geometric shape (i.e. concave radius, recess groove, and the like) via an assembly jig tool that generates a joint shape, while sealing off any unwanted adhesive dispensed past the front joint.

The dimensions 470 and 480 may be sized relatively smaller than those shown in the Background. Essentially, the width and thickness for a bezel portion of the lens assembly may be smaller. Accordingly, more packaging space may be employed for touch sensors and other electrical componentry provided along with a lens assembly. Additionally, the distance from the lens to display may be reduced compared to FIG. 2; this is important for certain lens with antiglare surfaces that degrade the quality of the image with increasing distance between lens and display.

FIGS. 6(*a*), (*b*) and (*c*) illustrate an example of the lens assembly undergoing various environmental conditions. In the various examples shown, the lens assembly is provided in different temperatures and environments. In FIG. 6(*b*), the lens assembly is in a relatively normal temperature, and the various elements shown are of a normal size.

In FIG. 6(*c*), the lens assembly is shown in a relatively hotter temperature from FIG. 6(*b*). Thus, pieces 410 and 420 expand more than lens 440 expands due to the thermal effects caused by the temperature. The adhesive 450 expands and maintains the lens assembly's general shape and contours.

In FIG. 6(*a*), the opposite effect of that shown in FIG. 6(*c*) is shown. Thus, a colder temperature causes the lens assembly pieces 410 and 420 to shrink relative to lens 440. In this case, leverage provided by the angled surfaces exert force on the adhesive 450 and the lens moves out of plane to relieve stress on frame 410 & lens 440 edges.

Figure 7:
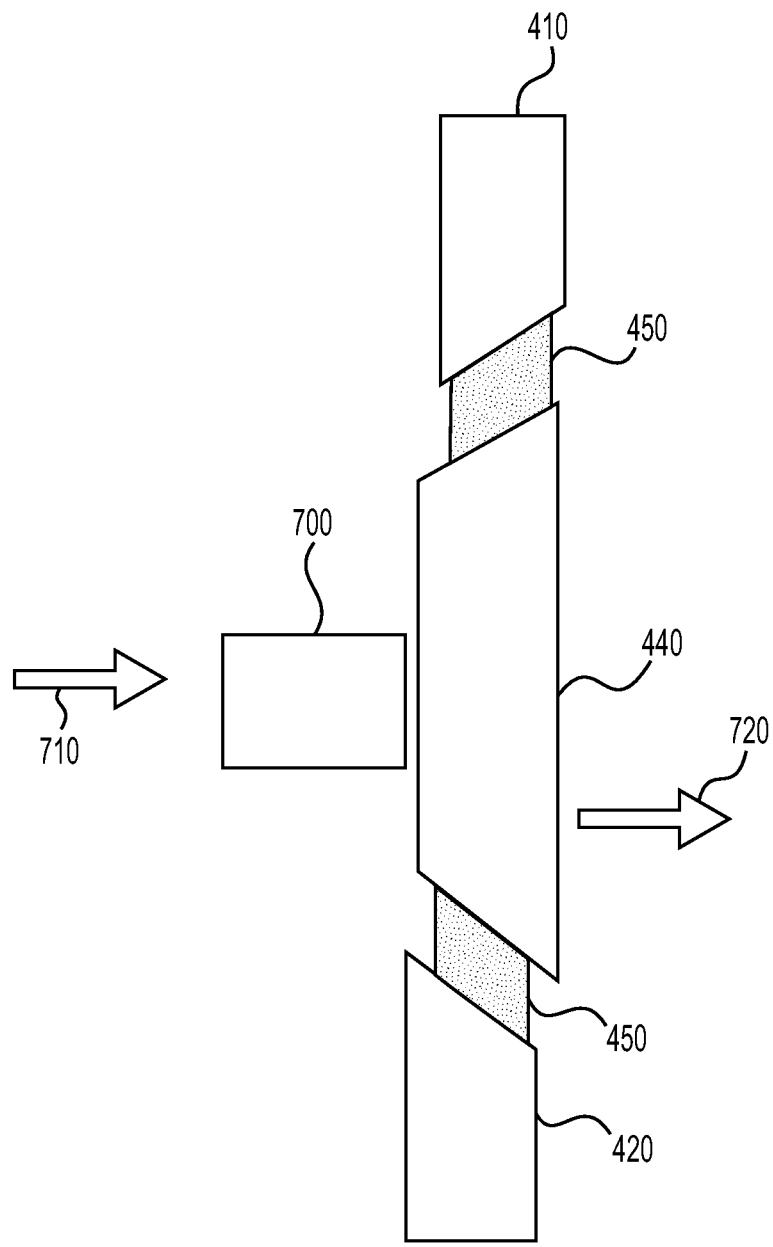
FIG. 7 illustrates another advantage of the lens assembly disclosed herein.

FIG. 7 illustrates another advantage of the lens assembly disclosed herein for meeting automotive head impact safety regulations. This is important in the case of an impact of significant force, such as during simulated head impact testing, where energy absorption and management of that energy is critical. As shown, the lens assembly undergoes contact via an object 700, with a force/direction 710. The lens assembly shown in FIG. 7 moves accordingly in direction 720. This permits increased safety through three techniques:

Technique 1: Shock damping of object 440 is achieved via viscoelastic deformation of item 450. It is not necessary for item 450 to stay within an elastic limit to be useful to pass the impact test; rather it merely needs to keep general retention of object 440 to object 410.

Technique 2: Deformation in direction 720 relieves stress on object 440 compared to FIG. 2 and FIG. 3 where object 110 and object 310 are physically constrained by object 220 and object 320, respectively.

Technique 3: Generally speaking, the weakest portion of glass lens object 440 tends to be where manufacturing defect flaws appear at object 440's edge. Object 450 acts to seal and limit breakage deformation at object 440 edges if breakage were to occur.

Thus, employing the structural elements shown in FIG. 7, the lens assembly may effectively undergo stresses and maintain structural integrity.

FIG. 7 illustrates an additional utility function of object 450, namely sealing to prevent contamination of internal objects such as the display that would impair visibility of the display from dust ingress or electrical shorting of sensitive components from liquids ingress that could occur from customer spills or rain entry in the case of accidental open sunroofs or convertible tops.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A lens assembly for an electronic display, comprising:
   a first frame piece with a first edge on a direction in which a viewer of the electronic display would face, the first edge forming a first angle with a second edge;
   a second frame piece with a third edge on the direction in which the viewer of the electronic display would face, the third edge forming a second angle with a fourth edge;
   a lens with a first lens edge facing the viewer, a second lens edge and a third lens edge connected to the first lens edge and forming a first lens angle and a second lens angle, respectively;
   a first adhesive layer placed between the second edge and the second lens edge to attach the first frame piece to the lens; and
   a second adhesive layer placed between the fourth edge and the third lens edge to attach the second frame piece to the lens,
   wherein a shape of the lens is a trapezoidal prism, and the first and the second adhesive layers are placed on non-parallel sides of the trapezoidal prism.

2. The lens assembly according to claim 1, wherein the electronic display is integrated into a center stack area of a vehicle.

3. The lens assembly according to claim 1, wherein the first angle and the second angle are less than 90 degrees.

4. The lens assembly according to claim 3, wherein the first and the second lens angles are more than 90 degrees.

5. The lens assembly according to claim 1, wherein the first and the second adhesive layers are defined by a Youngs modulus property ranging from between 0.1 through 10 Mpa.

6. The lens assembly according to claim 1, wherein a size of a gap between the first edge of the lens and at least one of the first adhesive layer and the second adhesive layer is spaced based on a predetermined determination as a function of temperature range, size of the lens and differential coefficient of expansion of the first and the second frame pieces and the lens.

7. The lens assembly according to claim 1, wherein the lens includes a first surface and a second surface, the first surface and the second surface defining opposing sides of the lens, the first surface and the second surface being rectangular shaped, with the first surface have a smaller surface area than the second surface.

8. The lens assembly according to claim 7, wherein the first surface defines a front portion of the electronic display.

9. The lens assembly according to claim 1, further comprising at least a first gap, the first gap being formed by a first surface of the first adhesive layer, and being in between the second edge and the second lens edge.

10. The lens assembly according to claim 1, further comprising at least a second gap, the second gap being formed by a second surface of the first adhesive layer, and being in between the second edge and the second lens edge, the second surface being on an opposing side of the first adhesive layer.

\* \* \* \* \*